Sept. 16, 1969   W. D. McGAHEE   3,466,672
FLUID TANK WITH DUMP VALVE
Filed June 1, 1966   2 Sheets-Sheet 1

INVENTOR
WELBOURNE D. McGAHEE

BY Harold W. Adams
ATTORNEY

3,466,672
FLUID TANK WITH DUMP VALVE

Welbourne D. McGahee, Eau-Gallie, Fla., assignor of one-fourth to William R. Maddux, Miami, Fla., and one-fourth to Jim Rathmann, Melbourne, Fla.
Filed June 1, 1966, Ser. No. 554,498
Int. Cl. E03d 1/36, 1/34, 5/02
U.S. Cl. 4—41             12 Claims

ABSTRACT OF THE DISCLOSURE

A fluid tank including an outlet valve and an independent, floatable ball for cooperating with a valve seat of said outlet valve to form a hermetic seal by reason of pressure differential existing above and below said floatable ball when positioned on said valve seat and valve means for momentarily equalizing the respective pressures creating said pressure differential and for breaking said hermetic seal and releasing said floatable ball from said valve seat to open said outlet valve.

---

This invention relates to a fluid tank with a dump valve, and, more particularly, to a fluid tank having a dump or drain valve operated by air pressure.

In conventional water closet tanks with outlet valves emptying fluid from the tank is accomplished by operating a handle which in turn is connected through a mechanical linkage to either lift a plug or a ball from a seat formed usually on the end of a drain pipe, for example. In other known tank constructions a ball is caused to settle over and seal an outlet with the pressure head of the water over the ball exceeding the pressure in the drain pipe beneath the ball so as to maintain a watertight seal. In these structures it is the practice to force the ball from the seat to break the seal by striking the ball with an arm which is connected for movement with a handle. Once the seal is broken, the water in the tank flows around the ball into the drain pipe and the ball floats to and upon the surface of the water in the tank until the water is drained. The ball then settles on the valve seat by gravity because of the slope and configuration of the tank bottom. A float with float-rod connected to a valve opens the valve to fill the tank to a predetermined level and then closes the valve.

The conventional flush tanks and outlet valves are prone to mechanical malfunctioning of arms and linkages which are operated by handle manipulation to release the valve ball or plug from its seat mechanically. The present invention overcomes these disadvantages by the provision of an air-operated valve which is reliable in operation over long periods of time. A ball stopper, which is seated on a discharge valve opening, is released from its hermetic sealing condition by introduction of air at atmospheric pressure beneath the valve seat in one embodiment of the invention. The air admitted under the ball valve seat exceeds that on top of the ball, and it then rises to float on the surface of the liquid in the tank as the liquid drains through the valve seat into a discharge pipe. A float valve controls the level of liquid in the tank, and opens the drain valve in the event of supply valve failure to shut off the intake of liquid into the tank. Accordingly, the tank is prevented from overflowing.

It is an object of this invention to provide a new and improved fluid tank with a pressure actuated dump valve.

Another object is the provision of a flush tank with valve mechanism which prevents tank overflow.

A further object is to provide a valve for gravity discharge of a liquid in a tank which is unique in concept of operation.

Still another object of this invention is the provision of valve operating mechanism silent in operation and devoid of mechanical linkages, rods, and the like.

Another object is the provision of a discharge valve for tanks which is enduring and fail-safe in operation.

Other objects and many attendant advantages of the present invention will become readily apparent from the following detailed description thereof when read in conjunction with the accompanying drawings, wherein.

Figure 1:
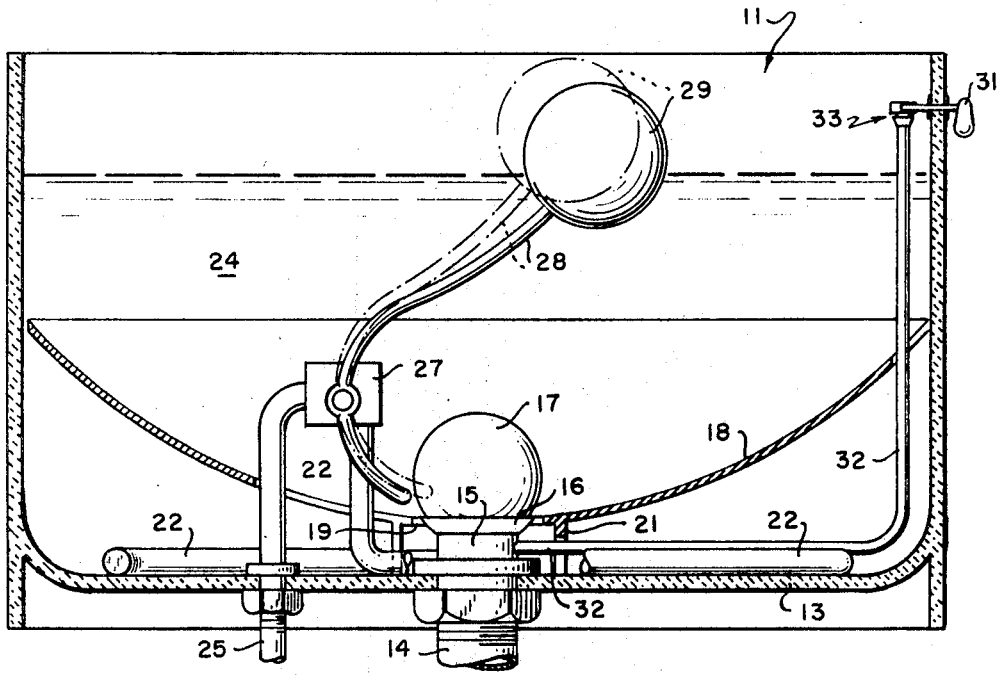
FIGURE 1 is a cross-sectional view of a flush tank with the discharge valve in closed or sealed condition.

Referring now to the drawings, wherein like reference numerals designate like or similar parts throughout the several views, there is shown in FIGURE 1, which represents a preferred embodiment of the invention, a tank generally designated numeral 11. The tank is rectangular in configuration and is of the conventional type of flush tank for toilets, having walls 12 and a recessed bottom 13. The typical drain pipe 14 is secured to the tank bottom, and a cylindrical valve 15 is positioned coaxially with the pipe 14 but is wholly within the tank 11. The valve 11 has an upwardly and outwardly flared seat 16 which is circular. A freely floatable ball 17 settles on the seat 16 to form a hermetic seal therewith. To enable the ball 17 to seat on the valve 15 a false bottom 18 is provided in the tank 11, and is disk-shaped, for example, such that the ball rolls onto the seat 16 which is received within an aperture 19 in the false bottom at its lowermost level when positioned in the tank on legs 21.

Figure 2:
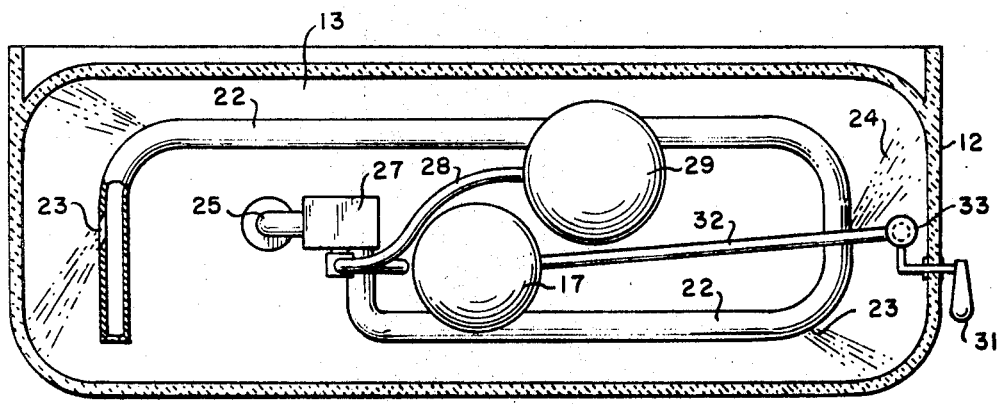
FIGURE 2 is a plan view of the tank and valve arrangement in FIGURE 1 with a false bottom of the tank removed to illustrate the positioning of elements of the invention.

A water supply tube 22, FIGURES 1 and 2, is located on the bottom 13 of the tank 11 beneath the false bottom 18. Radial discharge orifices 23 are spaced along the supply tube 22 at locations to direct fluid 24 into the tank in a pattern and at a direction with respect to the tank walls 12 whereby the liquid strikes the curved corner walls at an angle other than normal. In this fashion the liquid is admitted under pressure into the tank 11 without splash and turbulence, and noise is therefrom eliminated. Also, the position of the tube 22 at the bottom of the tank 11 makes possible the admittance of the liquid at the bottom of the tank and from a plurality of orifices 23 rather than through the end of a supply pipe directly onto the tank bottom as is the well known practice and which creates noise from the splash and turbulence incident to the operation of such constructions.

The supply tube 22 is connected in the usual manner to the tank bottom 13 and extends therethrough in communication with a supply conduit 25. A supply valve 27 is connected in the tube 22 to control the flow of liquid into the tank 11 and is located below the level of liquid normally in the tank for silent operation. The valve 27 is operated by an arm 28 fixed to a float 29 turning valve 27 "on" when the level of the liquid falls in the tank to a predetermined level when emptying of the tank through the valve 15 occurs.

The fill level of the liquid in the tank is predetermined, and the float 29 with its float-arm 28 operates the supply valve 27 to shut off the supply of liquid at such level. Should the valve malfunction, however, and not shut off the supply of water at the desired level and the level rise in the tank 11, overflow is prevented by the action of the arm 28 which is curved to strike the ball 17 and dislodge it from its sealing engagement on the seat 16. When the hermetic seal is broken, the liquid drains from the tank via the valve 15. This operation which prevents overflow occurs repeatedly until the valve 27 does shut off the supply of liquid in the manner above-described or until the liquid supply through conduit 25 is turned off at a valve removed from the tank location.

The ball 17 is unseated from the valve 15 in a normal operation by partial rotation of a conventional handle 31 at the side of the tank in customary location. The emptying of the tank 11, or flushing, takes place when the ball 17 is removed from the seat 16 as discussed hereinbefore. An air pipe 32 is connected in the valve 15 below the seat 16 and opens into the valve 15 below the ball 17 when seated. An air valve 33 is opened to the atmosphere when the handle 31 is rocked through the arc. The air at atmospheric pressure is admitted via the air pipe 32 into the valve 15 and the increased pressure then beneath the ball 17 forces it off the seat 16, the air pressure in valve 15 being negative after the liquid of the tank empties therethrough when the ball 17 seals the valve shut. The air valve 33 is not shown in detail, it being a typical valve which has a spool, for example, which covers an air port when the handle 31 is in a position of rest, and which opens a port when the handle 31 is turned through a small arc.

The modification of the invention thus far described may incorporate other forms of tank shapes and valve configurations without departing from the spirit and scope of the invention. For example, the ball 17 and seat 16 may be of a different design so long as a hermetic seal of the general nature of the invention is accomplished.

Figure 3:
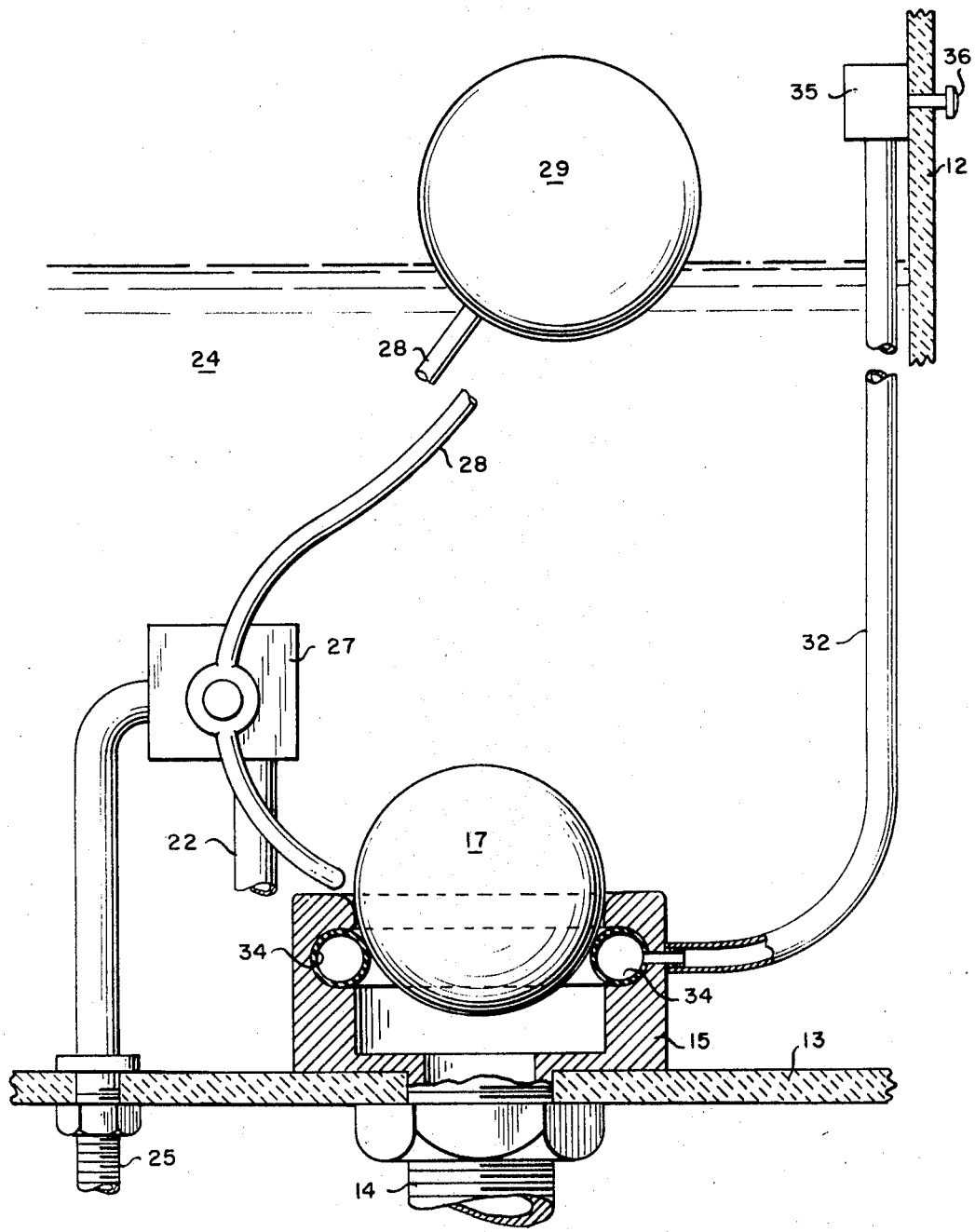
FIGURE 3 shows a second embodiment of the invention with an inflatable ring seat disposed in the tank with a ball thereon effecting a hermetic seal.

Referring now to the embodiment shown in FIGURE 3 of the drawing, an inflatable valve seat 34 is positioned within the valve 15 so as to contact the ball 17 sealingly. The inflatable seat is of a cross-section to contact the ball 17 and seal the valve closed at ambient atmospheric pressure. To dislodge the ball from its sealing contact with the seat 34 the seat is inflated slightly by the provision of an air pump schematically shown as numeral 35. A portion of the wall of the seat preferably is weakened along its line of contact with the ball 17 such that only a slight pressure of air will deform that portion of the weakened wall of the seat and break the engagement with the ball 17. A push-button plunger 36 actuates the pump 35 for a time period sufficient to inflate the seat 34.

A further concept of this invention is the provision of a vacuum air pump 35 whereby air is withdrawn from the seat to deform it the extent necessary to dislodge the ball 17. The plunger 36 actuates the vacuum pump 35 for the period of time necessary to withdraw the required amount of air from the seat. This embodiment of the invention makes possible the positive flushing of a tank by means of the pump and seat action without the customary mechanical linkages. Other elements of the FIGURE 3 modification are similar to those shown in FIGURES 1 and 2 as hereinbefore described, the difference in these embodiments residing in the valve and valve actuating system only.

What is claimed is:

1. In combination with a flush tank including an inlet valve connected to a source of fluid and adapted to be filled to a predetermined level and having an outlet valve with a valve seat disposed to be opened to discharge said fluid from said tank and close said valve to fill said tank with fluid to said predetermined level the improvement comprising: an independent floatable ball positioned within said tank adapted to seat on said valve seat by force of gravity to form a hermetic seal between said ball and said valve seat by action of pressure differential existing between the tank and said outlet valve with the pressure below the ball when seated less than that acting on the ball above the seat and valve; means for momentarily increasing and equalizing the respective pressures above and below the valve seat and for breaking said hermetic seal whereby said ball is released and lifted from said valve seat to open said valve.

2. The combination as in claim 1 wherein the means for increasing the pressure is an air valve operable to admit atmospheric air below the valve seat when the ball is seated thereon.

3. The combination as in claim 2 including additional means for physically unseating the ball responsive to the level of liquid in the tank to open said outlet valve whereby overflow is prevented.

4. Apparatus as defined in claim 1 wherein said valve seat comprises a ring-shaped hollow seat, and including means to vary the pressure of said seat interior whereby the seat is deformed to break said seal between said ball and said seat to open said outlet valve.

5. Apparatus as defined in claim 4 wherein said means is a vacuum pump to withdraw air from said seat.

6. Apparatus as defined in claim 4 wherein said means is a pressure pump for inflating said seat.

7. Apparatus as defined in claim 1 including an arm operatively connected to said inlet valve, said arm having a float thereon and means formed on said arm for dislodging said ball from said seat to open said outlet valve to discharge said fluid in said tank when said fluid exceeds said predetermined level, said arm opening said inlet valve as said float thereon falls with the liquid level in said tank.

8. Apparatus as defined in claim 1 including a supply tube connected to said inlet valve disposed near the bottom of said tank, said supply tube being provided with a plurality of orifices whereby fluid is discharged into said tank through said orifices in a plurality of streams angularly directed against the side walls of said tank.

9. A dump valve for a fluid tank comprising:
an outlet in said tank; a hollow air-filled valve seat positioned around said outlet; a freely floatable ball adapted to be received within said valve seat to effect a hermetic seal therebetween; and pressure means for deforming said valve seat and for breaking said hermetic seal between said valve seat and said floatable ball whereby said ball is released from said valve seat and rises within the fluid in said tank.

10. Apparatus as defined in claim 9 wherein said means for deforming said hollow valve seat comprises pressure means for varying internal pressure within said valve seat.

11. Apparatus as defined in claim 10 wherein said means for deforming said valve seat is a vacuum pump for reducing the pressure within said valve seat.

12. Apparatus as defined in claim 10 wherein said means for deforming said valve seat is a pressure pump for inflating said valve seat.

References Cited

UNITED STATES PATENTS

| | | | |
|---|---|---|---|
| 1,063,125 | 5/1913 | Gowey | 4—38 |
| 2,740,129 | 4/1956 | Braswell | 4—57 |
| 2,741,776 | 4/1956 | Christie et al. | 4—57 |
| 2,883,675 | 4/1959 | Hartman | 4—57 |
| 2,884,648 | 5/1959 | Dykes | 4—43 |
| 3,088,122 | 5/1963 | Pore | 4—67 |
| 3,320,622 | 5/1967 | Wustner | 4—57 |

LAVERNE D. GEIGER, Primary Examiner

HENRY K. ARTIS, Assistant Examiner

U.S. Cl. X.R.

4—57, 67